United States Patent
Gidcumb et al.

(10) Patent No.: US 9,962,736 B2
(45) Date of Patent: May 8, 2018

(54) LOW-GLOSS, FLEXIBLE CLEAR COATS, ARTICLES OF MANUFACTURE HAVING LOW-GLOSS, TWO COAT PAINT SYSTEMS, AND METHODS FOR APPLYING THE SAME

(75) Inventors: Yuko Nagata Gidcumb, Canton, MI (US); Scott Dale Kubish, Saline, MI (US); Joe Mecozzi, St. John, IN (US); Makoto Imai, Tinley Park, IL (US)

(73) Assignees: Toyota Motor Engineering & Manufacturing North America, Inc., Plano, TX (US); NB Coatings, Inc., Lansing, IL (US)

( * ) Notice: Subject to any disclaimer, the term of this patent is extended or adjusted under 35 U.S.C. 154(b) by 815 days.

(21) Appl. No.: 12/877,331

(22) Filed: Sep. 8, 2010

(65) Prior Publication Data

US 2012/0058345 A1 Mar. 8, 2012

(51) Int. Cl.
| | |
|---|---|
| *B05D 7/00* | (2006.01) |
| *C09D 7/00* | (2018.01) |
| *B32B 27/28* | (2006.01) |
| *B05D 3/02* | (2006.01) |
| *B32B 27/36* | (2006.01) |
| *C08L 1/00* | (2006.01) |
| *B32B 27/30* | (2006.01) |
| *B32B 27/34* | (2006.01) |
| *C08K 3/36* | (2006.01) |

(52) U.S. Cl.
CPC ............ *B05D 7/536* (2013.01); *C09D 7/42* (2018.01); *Y10T 428/31507* (2015.04); *Y10T 428/31551* (2015.04)

(58) Field of Classification Search
CPC ......... B32B 27/36; B32B 27/30; B32B 27/34; B32B 27/28; B05D 3/02; C08L 1/00; C09D 1/00; C08K 3/36

USPC ............ 524/447, 262, 539, 560, 589, 599; 428/412, 423.1, 446

See application file for complete search history.

(56) References Cited

U.S. PATENT DOCUMENTS

| | | | |
|---|---|---|---|
| 5,750,234 A | 5/1998 | Johnson et al. | |
| 6,582,684 B1 * | 6/2003 | Abrahamson | 424/63 |
| 6,730,740 B1 | 5/2004 | Mestach et al. | |
| 8,343,631 B2 * | 1/2013 | Gidcumb et al. | 428/423.1 |
| 2002/0026006 A1 * | 2/2002 | Garcia et al. | 524/591 |
| 2002/0111421 A1 | 8/2002 | Van Rooyen | |
| 2003/0108757 A1 | 6/2003 | Hovatter et al. | |

(Continued)

OTHER PUBLICATIONS

W.R. Grace, Columbia, MD USA, Coatings Product Overview, Syloid Grades, 2006. http://www.grace.com/engineeredmaterials/productsandapplications/coatings/mattingagents/syloidapplicationsandcharacteristics/SyloidGradesOverview.aspx.*

*Primary Examiner* — Ling Choi
*Assistant Examiner* — Ronald Grinsted
(74) *Attorney, Agent, or Firm* — Dinsmore & Shohl LLP

(57) ABSTRACT

Low-gloss flexible clear coat can include a base formula that includes a base resin and a cross-linker, a silica-based flattener, wherein the silica-based flattener comprises from 5 parts by weight per 100 parts by weight of the base formula to 20 parts by weight per 100 parts by weight of the base formula, one or more flattener enhancing agents, wherein the one or more flattener enhancing agents comprise 0.25 parts by weight per 100 parts by weight of the base formula to 5 parts by weight per 100 parts by weight of the base formula, and possess 90° flexibility and a 60° gloss finish from 22 gloss units to 34 gloss units.

19 Claims, 2 Drawing Sheets

(56) References Cited

U.S. PATENT DOCUMENTS

2003/0211334 A1 11/2003 Jones
2007/0082211 A1 4/2007 Hazan et al.
2009/0012226 A1 1/2009 Coogan et al.
2009/0047477 A1* 2/2009 Roys et al. .................. 428/156

* cited by examiner

LOW-GLOSS, FLEXIBLE CLEAR COATS, ARTICLES OF MANUFACTURE HAVING LOW-GLOSS, TWO COAT PAINT SYSTEMS, AND METHODS FOR APPLYING THE SAME

TECHNICAL FIELD

The present specification generally relates to clear coat paint and, more specifically, to low-gloss, flexible clear coats for vehicles.

BACKGROUND

Paints can possess numerous visual and physical characteristics such as color, gloss, weatherability, durability and other traits that may influence their service life and suitability for particular applications. To obtain the necessary properties, paint for vehicles can comprise either a monocoat system, where a basecoat is applied on top of a primer, or a two coat system, where an additional clear coat is applied on top of the basecoat. While monocoat systems can provide a low-gloss appearance for a vehicle surface, the low-gloss finish can be limited to black color paints which tend to have inferior weathering performance. The clear coats provided in two coat systems improve the weathering performance of a painted surface and can be applied to any color paint. However, clear coats can be limited to high gloss finishes. Thus, it may be advantageous to provide a clear coat for a two coat system that provides a low-gloss finish.

Accordingly, a need exists for alternative low-gloss, flexible clear coats for two coat systems.

SUMMARY

In one embodiment, a low-gloss, flexible clear coat may include a base formula that includes a base resin and a cross-linker. The low-gloss, flexible clear coat may further include a silica-based flattener, wherein the silica-based flattener comprises from 5 parts by weight per 100 parts by weight of the base formula to 20 parts by weight per 100 parts by weight of the base formula. The low-gloss, flexible clear coat may further include one or more flattener enhancing agents, wherein the one or more flattener enhancing agents comprise 0.25 parts by weight per 100 parts by weight of the base formula to 5 parts by weight per 100 parts by weight of the base formula. The low-gloss, flexible clear coat may also has a 90° flexibility and a 60° gloss finish from 22 gloss units to 34 gloss units when cured.

In another embodiment, an article of manufacture having a low-gloss, two coat paint system is provided. The article of manufacture may include an article of manufacture surface, a basecoat applied to the article of manufacture surface, and a low-gloss, flexible clear coat applied to a basecoat surface of the basecoat. The low-gloss, flexible clear coat may include a base formula comprising a base resin and a cross-linker, a silica-based flattener comprising from 5 parts by weight per 100 parts by weight of the base formula to 20 parts by weight per 100 parts by weight of the base formula, and one or more flattener enhancing agents comprising from 0.25 parts by weight per 100 parts by weight of the base formula to 5 parts by weight per 100 parts by weight of the base formula. The low-gloss, flexible clear coat may possess 90° flexibility and a 60° gloss finish from 22 gloss units to 34 gloss units when cured.

In yet another embodiment, a method for applying a low-gloss, two coat paint system, is provided. The method may include applying a basecoat to a vehicle part, curing the basecoat on the vehicle part, and applying a low-gloss, flexible clear coat to a basecoat surface of the basecoat. The low-gloss, flexible clear coat may include a base formula comprising a base resin and a cross-linker, a silica-based flattener comprising from 5 parts by weight per 100 parts by weight of the base formula to 20 parts by weight per 100 parts by weight of the base formula, and one or more flattener enhancing agents comprising from 0.25 parts by weight per 100 parts by weight of the base formula to 5 parts by weight per 100 parts by weight of the base formula. The method may further include curing the low-gloss, flexible clear coat to the basecoat surface of the basecoat and the low-gloss, flexible clear coat may possess 90° flexibility and a 60° gloss finish of 23 units to 33 units.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
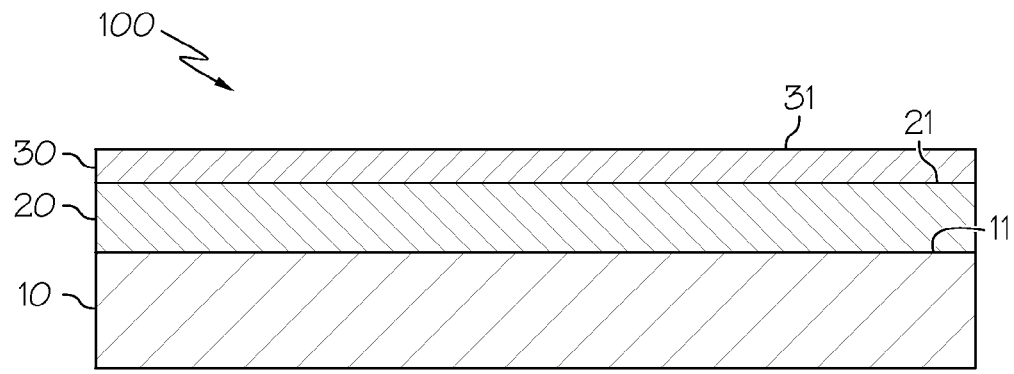
FIG. 1 schematically depicts a cross-sectional view of a low-gloss, two coat paint system according to one or more embodiments shown and described herein.

FIG. 1 generally depicts a cross-sectional view of a low-gloss, two coat paint system on a vehicle part. The low-gloss, two coat paint system generally comprises a basecoat covering the surface of the vehicle part and a low-gloss, flexible clear coat covering the basecoat. The low-gloss, flexible clear coat can comprise a base formula having a base resin, a cross-linker and a silica-based flattener. In addition to the base formula, the basecoat can further comprise a flattener enhancing agent to inhibit the settling and/or coagulation of the silica-based flattener. The low-gloss, flexible clear coat provides flexibility and increased weatherability to the low-gloss, two coat paint system while also providing a low-gloss appearance to a variety of basecoats. Low-gloss, flexible clear coats, articles of manufacturer with a low-gloss, two coat paint system, and methods for applying low-gloss, two coat paint systems will be described in more detail herein.

Figure 3:
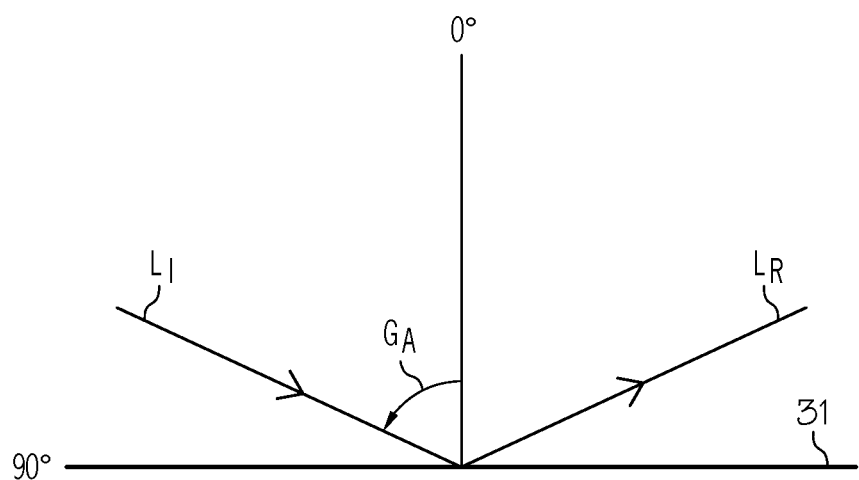
FIG. 3 schematically depicts measuring the low-gloss, flexible clear coat surface according to one or more embodiments shown and described herein.

Referring to FIG. 1, a low-gloss, two coat paint system 100 is illustrated as applied to a vehicle part 10. The low-gloss, two coat paint system 100 generally comprises a basecoat 20 and a low-gloss, flexible clear coat 30 which protects the basecoat 20 from weathering, abrasions, and/or other environmental conditions while also providing a low-gloss finish. The low-gloss, flexible clear coat 30 comprises a base formula, a silica-based flattener and a flattener enhancing agent to provide a 60° gloss finish of 22 gloss units to 34 gloss units when cured. As used herein, the term "flexible" means that the low-gloss, flexible clear coat 30 will not crack when it has been applied to a substrate and the substrate is bent 90° when cured. Also as used herein, the phrase "60° gloss finish" refers to the intensity of light reflected from the low-gloss, flexible clear coat surface 31 at a 60° angle of incline when cured. For example, FIG. 3 schematically illustrates an exemplary measurement of the gloss finish of a low-gloss, flexible clear coat surface 31. As illustrated, an incident light $L_I$ is applied to the low-gloss, flexible clear coat surface 31 such that reflected light $L_R$ is reflected off the surface, wherein the intensity of the reflected light $L_R$ is less than the intensity of the incident light $L_I$. The gloss angle $G_A$ is determined as the angle between the incident light $L_I$ and the movement to the low-gloss, flexible clear coat surface 31. Incident light $L_I$ coming from a gloss angle $G_A$ normal to the low-gloss, flexible clear coat surface 31 would possess a gloss angle $G_A$ of approximately 0°. Conversely, incident light $L_I$ coming from a gloss angle $G_A$ parallel with the low-gloss, flexible clear coat surface 31 would possess a gloss angle $G_A$ of approximately 90°. As used herein, the measurement for a "60° gloss finish" is ascertained from incident light $L_I$ with a 60° gloss angle $G_A$. The reflected light $L_R$ can be measured in terms of gloss units by any commercially available gloss meter such as the Novo Gloss LITE 60° Gloss Meter or the BYK Gardner 60° Gloss Meter.

In one embodiment described herein, the base formula of the low-gloss, flexible clear coat 30 comprises a base resin and a cross-linker. The base resin can comprise a polymeric resin or a combination of polymeric resins that interact with the cross-linker to provide 90° flexibility (such that the low-gloss, two coat point system does not crack after being bent 90° after curing). For example, the base resin can comprise polyester resins, acrylic resins, alkyd resins, urethane resins, polycarbonate resins and/or any other similar polymeric resins. In one exemplary embodiment, the base resin can comprise an acrylic polymer resin comprising acrylate and methacrylate monomers. The base resin can further comprise any weight percent of the overall base formula such that the low-gloss, flexible clear coat 30 possesses 90° flexibility when cured. For example, the base resin can comprise 50 weight percent to 90 weight percent of the base formula, 60 weight percent to 80 weight percent of the base formula, or about 75 weight percent of the base formula.

The base formula of the low-gloss, flexible clear coat 30 further comprises a cross-linker to cross-link the base resin and provide flexibility. The cross-linker can comprise any single polymeric cross-linking material or combinations of polymeric cross-linking materials that can combine with the base resin to provide 90° flexibility when cured. For example, the cross-linker may comprise melamines, isocyanates, blocked isocyanates, carbodiimides and/or any other similar polymeric cross-linking materials. In one exemplary embodiment, the cross-linker can comprise an isocyanurate trimer based on hexamethylene diisocyanate. The cross-linker can be present in the base formula at any weight percent of the overall base formula such that the low-gloss, flexible clear coat possesses 90° flexibility when cured. For example, in one embodiment, the cross-linker can comprise 10 weight percent to 40 weight percent of the base formula. In another embodiment, the cross-linker can comprise 20 weight percent to 35 weight percent of the base formula. In yet another embodiment, the cross-linker may be about 25 weight percent of the base formula. Similarly, the base resin and the cross-linker can comprise any weight ratio with respect to one another such that the base formula possesses 90° flexibility when cured. For example, in one embodiment, the weight ratio of the base resin to the cross-linker can be less than or equal to 10:1. In another embodiment, the weight ratio of the base resin to the cross-linker can be less than or equal to 5:1. In yet another embodiment, the weight ratio of the base resin to the cross-linker can be less than or equal to 3:1.

In addition to the base formula, the low-gloss, flexible clear coat 30 further comprises a silica-based flattener and a flattener enhancing agent. In one embodiment, the silica-based flattener comprises any silica-based material or combinations of silica-based materials that lower the gloss of the low-gloss, flexible clear coat 30 to a 60° gloss finish within a range from 22 gloss units to 34 gloss units when cured. For example, in one embodiment, the silica-based flattener can comprise any commercially available silicas including, but not limited to, thermally derived silicas, precipitated silicas, surface treated silicas, wax treated amorphous silicas, organically treated amorphous silicas, pyrogenic surface modified silicas, hydrophobic silicas or combinations thereof. In one exemplary embodiment, the silica-based flattener can comprise a pyrogenic surface modified silica. The low-gloss, flexible clear coat 30 can comprise any amount of the silica-based flattener that provides a low-gloss finish (i.e., a 60° gloss finish of 22 gloss units to 34 gloss units) when cured. For example, in one embodiment, the silica-based flattener may be present in an amount from 5 parts by weight per 100 parts by weight of the base formula to 20 parts by weight per 100 parts by weight of the base formula. In another embodiment, the silica-based flattener may be present in an amount from 10 parts by weight per 100 parts by weight of the base formula to 15 parts by weight per 100 parts by weight of the base formula. In yet another embodiment, the silica-based flattener may be added to comprise about 12 parts by weight per 100 parts by weight of the base formula.

As mentioned above, the low-gloss, flexible clear coat 30 includes a flattener enhancing agent in addition to the silica-based flattener to provide a 60° gloss finish of 22 units to 33 units when cured. The flattener enhancing agent can comprise any material that inhibits the settling and/or coagulation of the silica-based flattener in the low-gloss, flexible clear coat 30. For example, in one embodiment, the flattener enhancing agent can comprise one or more anti-settling agents. The anti-settling agent(s) can comprise any material that prevents the silica-based flattener from settling in the low-gloss, flexible clear coat 30 prior to its application to the basecoat surface 21 or while curing on the basecoat 20. For example, in one embodiment, the one or more anti-settling agents may be a silica, silicate, organoclay, bentonite, cellulosic, polycarbonate, polyamide, polyester, polyacrylate, polyacrylamide, polystyrene and/or any similar anti-settling agent. In one exemplary embodiment, the anti-settling agent can comprise styrene. Additionally or alternatively, the flattener enhancing agent can comprise one or more dispersants. The dispersants can comprise any material that breaks up and prevents coagulation of the silica-based flattener. For example, the one or more dispersants may be a siloxane, acrylic, wax and/or any similar dispersant or various combinations thereof.

The flattener enhancing agent can be added to the low-gloss, flexible clear coat 30 in any amount that limits the settling and/or coagulation of the silica-based flattener in the low-gloss, flexible clear coat 30. For example, in one embodiment, the flattener enhancing agent or flattener enhancing agents may comprise from 0.25 parts by weight per 100 parts by weight of the base formula to 5 parts by weight per 100 parts by weight of the base formula. In another embodiment, the flattener enhancing agent or flattener enhancing agents may comprise from 0.5 parts by weight per 100 parts by weight of the base formula to 2 parts by weight per 100 parts by weight of the base formula. In one embodiment, where the flattener enhancing agent is an anti-settling agent, the anti-settling agent may comprise from 0.25 parts by weight per 100 parts by weight of the base formula to 5 parts by weight per 100 parts by weight of the base formula. In another embodiment, where the flattener enhancing agent is an anti-settling agent, the anti-settling agent may comprise or from 0.5 parts by weight per 100 parts by weight of the base formula to 2 parts by weight per 100 parts by weight of the base formula. In yet another embodiment, where the flattener enhancing agent is an anti-settling agent, the anti-settling agent may comprise about 0.7 parts by weight per 100 parts by weight of the base formula. In one embodiment, where the flattener enhancing agent comprises a dispersant, the dispersant may comprise from 0.25 parts by weight per 100 parts by weight of the base formula to 5 parts by weight per 100 parts by weight of the base formula. In another embodiment, where the flattener enhancing agent comprises a dispersant, the dispersant may comprise from 0.3 parts by weight per 100 parts by weight of the base formula to 1 part by weight per 100 parts by weight of the base formula. In yet another embodiment, where the flattener enhancing agent comprises a dispersant, the dispersant may comprise about 0.4 parts by weight per 100 parts by weight of the base formula. Where the flattener enhancing agent comprises both an anti-settling agent and a dispersant, the anti-settling agent may comprise from 0.5 parts by weight per 100 parts by weight of the base formula to 2 parts by weight per 100 parts by weight of the base formula while the dispersant may comprise from 0.3 parts by weight per 100 parts by weight of the base formula to 1 part by weight per 100 parts by weight of the base formula. In another embodiment, where the flattener enhancing agent comprises both an anti-settling agent and a dispersant, the anti-settling agent may comprise about 0.7 parts by weight per 100 parts by weight of the base formula while the dispersant may comprise about 0.4 parts by weight per 100 parts by weight of the base formula. It should be appreciated that these ranges of flattener enhancing agents are exemplary only and by no means limiting. Accordingly, it should be understood that any other types and amounts of flattener enhancing agents may alternatively or additionally be used in the low-gloss, flexible clear coat 30 to limit the settling and/or coagulation of the silica-based flattener in the low-gloss, flexible clear coat 30 as appreciated herein.

In other embodiments, the low-gloss, flexible clear coat 30 may further comprise other additives to adjust one or more physical properties of the low-gloss, flexible clear coat 30. For example, other additives may influence the life of the low-gloss, flexible clear coat 30, the stability of the low-gloss, flexible clear coat 30, the manufacturability of the low-gloss, flexible clear coat 30, the cost of the low-gloss, flexible clear coat 30 and/or other properties that influence the suitability of the low-gloss, flexible clear coat 30 for a particular application. Examples of other additives can include, without limitation, UV agents, softening agents, metallic enhancing agents, surface treatments or any other additive than affects one or more physical properties of the low-gloss, flexible clear coat 30.

Still referring to FIG. 1, the low-gloss, two coat paint system 100 further comprises a basecoat 20 which is protected from weathering, abrasions, or other environmental conditions by the low-gloss, flexible clear coat 30. The basecoat 20 can comprise any paint formulation that is suitable for use on a vehicle part or other article of manufacture. For example, the basecoat 20 itself may comprise various visual and physical characteristics such as color, gloss, weatherability, durability and/or other traits that may influence its potential life and suitability for particular applications. The basecoat 20 may thereby comprise any paint formulation than may include a variety of elements that can individually influence one or more of its physical and/or visual characteristics. For example, in one embodiment, the basecoat 20 may comprise various resins and/or solvents. In another embodiment, the basecoat 20 may further comprise one or more additives such as pigments and/or metallic flakes to obtain a basecoat 20 with a desired color or appearance. In yet another embodiment, the basecoat 20 may include other components that influence the life of the basecoat 20, the stability of the basecoat 20, the manufacturability of the basecoat 20, the cost of the basecoat 20 and/or other properties that influence the suitability of the basecoat 20 for a particular application.

In one particular embodiment, the basecoat 20 may comprise a flexible basecoat similar to the low-gloss, flexible clear coat 30. In such an embodiment, the basecoat 20 may possess the same flexibility as the low-gloss, flexible clear coat 30, greater flexibility than the low-gloss, flexible clear coat 30, or less flexibility than the low-gloss, flexible clear coat 30. For example, in one particular embodiment, the basecoat 20 may not crack when it has been applied to a substrate and the substrate is bent 90° similar to the low-gloss, flexible clear coat 30.

Still referring to FIG. 1, the low-gloss, two coat paint system 100 (comprising the low-gloss, flexible clear coat 30 and the basecoat 20) may be applied on a vehicle part 10. The vehicle part can comprise any part of a vehicle which may require a painted surface. For example, a vehicle part 10 may comprise a door, hood, trunk, or any other exterior part. In one specific embodiment, the vehicle part 10 may comprise a part that is susceptible to collisions, such as a bumper for a vehicle. In such an embodiment, the low-gloss, flexible clear coat 30 is resistant from cracking when the vehicle part is bent due to its flexible properties. Accordingly, it should be understood that the painting system provides a low-gloss finish to the vehicle part 10 in conjunction with weathering performance and durability.

In another embodiment, the low-gloss, two coat paint system 100 may be applied to any other article of manufacture. The article of manufacture can comprise any part, component, device or the like that is machined, assembled or otherwise created by a manufacturer. Articles of manufacture can include, for example, vehicle accessories, construction equipment, toys, models, or any other article to which a low-gloss flexible coating may be applied.

Figure 2:
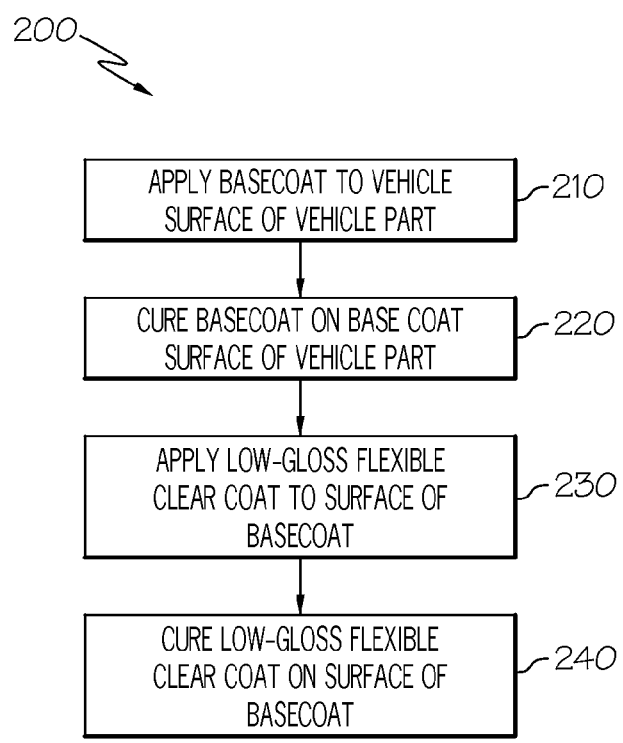
FIG. 2 depicts a flow diagram of a method for applying a low-gloss, two coat paint system according to one or more embodiments shown and described herein.

Referring now to FIGS. 1 and 2, the low-gloss, two coat paint system 100 may be applied to a vehicle part 10 (or any other article of manufacture) by applying the basecoat 20 to a vehicle surface 11 of a vehicle part 10 in step 210. The basecoat 20 can be applied in any manner to cover the vehicle surface 11 of the vehicle part 10 with the basecoat 20. For example, the basecoat 20 can be applied to the vehicle surface 11 with spray guns, brushes, submersion or any similar manner of deposition either alone or in combination. After the basecoat 20 is applied to the vehicle surface 11 of the vehicle part 10 in step 210, the basecoat 20 may be cured on the vehicle surface 11 of the vehicle part 10 in step 220. Curing can comprise any methodology to allow the basecoat 20 to set such that the basecoat 20 does not shift or deform due to gravity, physical contact or the like. In one embodiment, curing can take place at room temperature in standard atmospheric conditions. Alternatively, the basecoat 20 may be cured on the vehicle surface 11 of the vehicle part 10 in step 220 at an elevated temperature (such as, for example, via heat lamps), with controlled atmospheric conditions (such as, for example, an inert atmosphere), and/or with other environmental assistance (such as, for example, fans or blowers).

After the basecoat is cured on the vehicle surface 11 of the vehicle part 10 in step 220, the low-gloss, flexible clear coat 30 is applied to the basecoat surface 21 of the basecoat 20 in step 230. Similar to the application of the basecoat in step 210, the low-gloss, flexible clear coat 30 can be applied in any manner to cover the basecoat surface 21 of the basecoat 20 with the low-gloss, flexible clear coat 30, such as, for example, via spray guns, brushes, submersion or the like. Furthermore, the low-gloss, flexible clear coat 30 may be applied in any thickness relative to the thickness of the basecoat 20. For example, the layer of the low-gloss, flexible clear coat 30 may be less thick, more thick or substantially as thick as the layer of the basecoat 20. Finally, after the low-gloss, flexible clear coat 30 is applied to the basecoat surface 21 of the basecoat 20 in step 230, the low-gloss, flexible clear coat 30 may be cured on the basecoat surface 21 of the basecoat 20 in step 240. Similar to curing the basecoat 20 in step 220, the low-gloss, flexible clear coat 30 may be cured in step 240 using any methodology to allow the low-gloss, flexible clear coat 30 to set such that the low-gloss, flexible clear coat 30 does not shift or deform due to gravity, physical contact or the like. In one embodiment, the curing of the low-gloss, flexible clear coat 30 in step 240 may comprise the same curing process used for curing the basecoat 20 in step 220. In another embodiment, the curing of the low-gloss, flexible clear coat 30 in step 240 may comprise a different curing process from that used for curing the basecoat 20 in step 220.

It should also be appreciated that any other steps may additionally be employed throughout the application method 200 to apply a low-gloss, two coat paint system 100 to a vehicle part 10. For example, in one embodiment, two coats of the basecoat 20 may be applied to the vehicle part 10 prior to applying the low-gloss, flexible clear coat 30. In another embodiment, to coats of low-gloss, flexible clear coat 30 may be applied to the basecoat 20. In yet another embodiment, additional surface treatment steps may be employed to clean, dry or otherwise prepare a surface set to receive the basecoat 20 or the low-gloss, flexible clear coat 30.

EXAMPLE

Multiple low-gloss, flexible clear coats were examined for gloss level and weatherability. Specifically, six samples were provided for testing. Each sample comprised a base resin comprising acrylic polymer resin comprising acrylate and methacrylate monomers with styrene. The base resin comprised about 70 weight percent of the base formula for each of the six samples. The silica-based flattener used for each sample comprised wax treated amorphous silicon dioxide (WTA-$SiO_2$), organically treated amorphous silicon dioxide (OTA-$SiO_2$), pyrogenic surface modified silicon dioxide (PSM-$SiO_2$) or hydrophobic silicon dioxide (H—$SiO_2$).

The initial 60° gloss finish (i.e., "Initial Gloss") was measured for each sample prior to weathering simulation. The samples were then subjected to an accelerated weatherometer comprising a xenon light source of 500 mega joules (MJ) for a total of 2,336 hours (which may be comparable to a few years of actual weathering). Following the weathering simulation, the final 60° gloss finish was measured (i.e., "Final Gloss"). The Final Gloss Retention was then determined by dividing the Final Gloss by the Initial Gloss as an indicator of the weathering performance for each sample.

TABLE 1

Weatherability Analysis for Low-gloss, flexible clear coats

| | Sample | | | | | |
|---|---|---|---|---|---|---|
| | 1 | 2 | 3 | 4 | 5 | 6 |
| Silica-based Flattener | WTA-$SiO_2$ | OTA-$SiO_2$ | OTA-$SiO_2$ | PSM-$SiO_2$ | PSM-$SiO_2$ | H-$SiO_2$ |
| Weight Percent Silica-based Flattener in Base Formula | 12% | 12% | 14% | 11.25% | 5.50% | 15% |
| 90° Flexibility | Yes | Yes | Yes | Yes | Yes | Yes |
| Initial Gloss (Gloss Units) | 25 | 29 | 15 | 23.5 | 22.5 | 34 |
| Final Gloss (Gloss Units) | 9 | 11.1 | 8.7 | 8 | 17 | 13 |
| Final Gloss Retention (%) | 36 | 38 | 58 | 34 | 76 | 38 |

As seen in Table 1, Initial Gloss varied based at least in part on the weight percent of the silica-based flattener in the base formula and the type of silica-based flattener. For example, the Initial Gloss ranged from 15 gloss units for Sample 3 (which comprised 14 weight percent of organically treated amorphous silicon dioxide) to 34 gloss units for Sample 6 (which comprised 15 weight percent of hydrophobic silicon dioxide. When 12 weight percent of the silica-based flattener was used, the organically treated amorphous silicon dioxide (Sample 2) resulted in an Initial Gloss of 29 gloss units while the wax treated amorphous silicon dioxide (Sample 1) resulted in an even lower Initial Gloss of 25 gloss units.

Also as seen in Table 1, the Final Gloss Retention varied based on the weight percent of the silica-based flattener in the base formula and the type of silica-based flattener used. For example, when pyrogenic surface modified silicon dioxide was used at 11.25 weight percent (Sample 4), the low-gloss, flexible clear coat resulted in a Final Gloss Retention rate of 34 percent. However, when pyrogenic surface modified silicon dioxide was used at 5.5 weight percent (Sample 5), the low-gloss, flexible clear coat resulted in a Final Gloss Retention of 34 percent. Also, when 12 weight percent of the silica-based flattener was used, the organically treated amorphous silicon dioxide (Sample 2) resulted in a Final Gloss Retention rate of 38 percent while the wax treated amorphous silicon dioxide (Sample 1) resulted in final gloss retention of 36 percent. By varying at least the type and amount of silica-based flattener, various low-gloss, flexible clear coats with different gloss levels and weatherability properties can be produced.

It should now be appreciated that low-gloss, flexible clear coats may be applied to basecoats on vehicle parts or other articles of manufacture to provide both a low-gloss finish and flexibility. The low-gloss, flexible clear coat can generally comprise a base formula comprising a base resin and a cross-linker. In addition to the base formula, the silica-based flattener and one or more flattener enhancing agents may be combined in the low-gloss, flexible clear coat. The low-gloss, flexible clear coat may thereafter be applied to a basecoat to provide a low-gloss, two coat paint system 100 that allows additional protection and durability to the appearance of a vehicle or other article of manufacture while still providing a low-gloss flexible finish.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A low-gloss, flexible clear coat comprising:
   a base formula comprising a base resin and a cross-linker, wherein the base resin comprises an acrylic polymer resin in an amount of from 50 weight percent to 90 weight percent of the base formula;
   a silica-based flattener, wherein the silica-based flattener comprises from 5 parts by weight per 100 parts by weight of the base formula to 20 parts by weight per 100 parts by weight of the base formula; and
   one or more flattener enhancing agents, wherein the one or more flattener enhancing agents comprise 0.25 parts by weight per 100 parts by weight of the base formula to 5 parts by weight per 100 parts by weight of the base formula, wherein the low-gloss, flexible clear coat has a 90° flexibility and a 60° gloss finish from 22 gloss units to 34 gloss units when cured, and wherein the one or more flattener enhancing agents comprises an anti-settling agent.

2. The low-gloss, flexible clear coat of claim 1, wherein the silica-based flattener is selected from the group consisting of thermally derived silicas, precipitated silicas, surface treated silicas, wax treated amorphous silicas, organically treated amorphous silicas, pyrogenic surface modified silicas, hydrophobic silicas and combinations thereof.

3. The low-gloss, flexible clear coat of claim 2, wherein the silica-based flattener comprises about 5.5 parts by weight pyrogenic surface modified silica per 100 parts by weight of the base formula.

4. The low-gloss, flexible clear coat of claim 1, wherein the acrylic polymer resin comprises acrylate and methacrylate monomers.

5. The low-gloss, flexible clear coat of claim 1, wherein the cross-linker is selected from the group consisting of melamines, isocyanates, carbodiimides, blocked isocyanates, and combinations thereof.

6. The low-gloss, flexible clear coat of claim 1, wherein the cross-linker is an isocyanurate trimer based on hexamethylene diisocyanate.

7. The low-gloss, flexible clear coat of claim 1, wherein the anti-settling agent is selected from the group consisting of silicas, silicates, organoclays, bentonites, cellulosics, polycarbonates, polyamides, polyesters, polyacrylates, polyacrylamides, polystyrenes and combinations thereof.

8. The low-gloss, flexible clear coat of claim 1, wherein the anti-settling agent is styrene.

9. The low-gloss, flexible clear coat of claim 1, wherein the one or more flattener enhancing agents further comprises a dispersant selected from the group consisting of siloxanes, acrylics, waxes and combinations thereof.

10. An article of manufacture having a low-gloss, two coat paint system, the article of manufacture comprising:
    an article of manufacture surface;
    a basecoat applied to the article of manufacture surface; and
    a low-gloss, flexible clear coat applied to a basecoat surface of the basecoat, wherein the low-gloss, flexible clear coat comprises:
       a base formula comprising a base resin and a cross-linker, wherein the base resin comprises an acrylic polymer resin in an amount of from 50 weight percent to 90 weight percent of the base formula;
       a silica-based flattener comprising from 5 parts by weight per 100 parts by weight of the base formula to 20 parts by weight per 100 parts by weight of the base formula; and
       one or more flattener enhancing agents comprising from 0.25 parts by weight per 100 parts by weight of the base formula to 5 parts by weight per 100 parts by weight of the base formula, wherein the low-gloss, flexible clear coat comprises 90° flexibility and a 60° gloss finish from 22 gloss units to 34 gloss units when cured, and wherein the one or more flattener enhancing agents comprises an anti-settling agent.

11. The article of manufacture of claim 10, wherein the cross-linker is selected from the group consisting of melamines, isocyanates, carbodiimides, blocked isocyanates, and combinations thereof.

12. A method for applying a low-gloss, two coat paint system, the method comprising:
    applying a basecoat to a vehicle part;
    curing the basecoat on the vehicle part;
    applying a low-gloss, flexible clear coat to a basecoat surface of the basecoat, wherein the low-gloss, flexible clear coat comprises:
       a base formula comprising a base resin and a cross-linker, wherein the base resin comprises an acrylic polymer resin in an amount of from 50 weight percent to 90 weight percent of the base formula;
       a silica-based flattener comprising from 5 parts by weight per 100 parts by weight of the base formula to 20 parts by weight per 100 parts by weight of the base formula; and
       one or more flattener enhancing agents comprising from 0.25 parts by weight per 100 parts by weight of the base formula to 5 parts by weight per 100 parts by weight of the base formula, and wherein the one or more flattener enhancing agents comprises an anti-settling agent; and
    curing the low-gloss, flexible clear coat to the basecoat surface of the basecoat, wherein the low-gloss, flexible clear coat comprises 90° flexibility and a 60° gloss finish of 22 units to 34 units after curing.

13. The method of claim 12, wherein the cross-linker is selected from the group consisting a melamines, isocyanates, carbodiimides, blocked isocyanates and combinations thereof.

14. The low-gloss, flexible clear coat of claim 2, wherein the silica-based flattener is a pyrogenic surface modified silica.

15. The article of manufacture of claim 10, wherein the silica-based flattener is selected from the group consisting of thermally derived silicas, precipitated silicas, surface treated silicas, wax treated amorphous silicas, organically treated amorphous silicas, pyrogenic surface modified silicas, hydrophobic silicas and combinations thereof.

16. The method of claim 12, wherein the silica-based flattener is selected from the group consisting of thermally derived silicas, precipitated silicas, surface treated silicas, wax treated amorphous silicas, organically treated amorphous silicas, pyrogenic surface modified silicas and/or hydrophobic silicas, and combinations thereof.

17. The low-gloss, flexible clear coat of claim 1, wherein the silica-based flattener is selected from the group consisting of organically treated amorphous silicas, hydrophobic silicas and combinations thereof.

18. The article of manufacture of claim 10, wherein the silica-based flattener is selected from the group consisting of organically treated amorphous silicas, hydrophobic silicas and combinations thereof.

19. The method of claim 12, wherein the silica-based flattener is selected from the group consisting of organically treated amorphous silicas, hydrophobic silicas and combinations thereof.

* * * * *